(12) United States Patent
Tashiro et al.

(10) Patent No.: US 8,004,955 B2
(45) Date of Patent: Aug. 23, 2011

(54) COUPLING LENS AND OPTICAL INFORMATION RECORDING/REPRODUCING DEVICE HAVING THE SAME

(75) Inventors: Yoshiyuki Tashiro, Kanagawa (JP); Shuichi Takeuchi, Saitama (JP)

(73) Assignee: Hoya Corporation, Tokyo (JP)

( * ) Notice: Subject to any disclaimer, the term of this patent is extended or adjusted under 35 U.S.C. 154(b) by 395 days.

(21) Appl. No.: 12/251,795

(22) Filed: Oct. 15, 2008

(65) Prior Publication Data

US 2009/0109827 A1    Apr. 30, 2009

(30) Foreign Application Priority Data

Oct. 24, 2007    (JP) ................................ 2007-276441

(51) Int. Cl.
G11B 7/00    (2006.01)
(52) U.S. Cl. .................................................. 369/112.23
(58) Field of Classification Search ............. 369/112.23, 369/112.01, 44.23, 112.24; 359/716–719, 359/721
See application file for complete search history.

(56) References Cited

U.S. PATENT DOCUMENTS

| | | | | |
|---|---|---|---|---|
| 3,586,419 A | * | 6/1971 | Wakimoto et al. | 359/793 |
| 4,768,867 A | * | 9/1988 | Suda | 359/719 |
| 6,049,519 A | * | 4/2000 | Arai et al. | 369/112.24 |
| 7,116,495 B2 | * | 10/2006 | Saito | 369/112.01 |
| 7,551,371 B2 | * | 6/2009 | Abe | 369/112.24 |
| 2003/0081528 A1 | | 5/2003 | Saito | |
| 2004/0150892 A1 | | 8/2004 | Takeuchi et al. | |
| 2004/0246872 A1 | | 12/2004 | Takeuchi | |
| 2007/0242590 A1 | | 10/2007 | Koizumi et al. | |

FOREIGN PATENT DOCUMENTS

| | | |
|---|---|---|
| JP | 2001-159731 | 6/2001 |
| JP | 2003-114382 | 4/2003 |

OTHER PUBLICATIONS

English language Abstract of JP 2001-159731, Jun. 12, 2001.
English language Abstract of JP 2003-114382, Apr. 18, 2003.

* cited by examiner

Primary Examiner — Thang V Tran
(74) Attorney, Agent, or Firm — Greenblum & Bernstein P.L.C.

(57) ABSTRACT

There is provided a coupling lens used in an optical information recording/reproducing device for recording information to and/or reproducing information from an optical disc. The coupling lens includes a first surface and a second surface, wherein the coupling lens is configured to satisfy a following condition (1):

$$-0.80 \leq Z \leq 0.40 \qquad (1),$$

wherein a value Z is obtained from a following equation (E1):

$$Z = \frac{\frac{d}{dn}(L')}{L'} = \frac{(A-B)}{(D-E)} - \frac{(F-G)}{(H-I)}. \qquad (E1)$$

5 Claims, 4 Drawing Sheets

COUPLING LENS AND OPTICAL INFORMATION RECORDING/REPRODUCING DEVICE HAVING THE SAME

BACKGROUND OF THE INVENTION

The present invention relates to a coupling lens forming an optical system of a device, such as an optical information recording/reproducing device for recording information to and/or reproducing information from an optical disc.

In general, an optical information recording/reproducing device is configured such that the degree of divergence of a light beam emitted by a light source is converted by a coupling lens and the converted light beam is converged by an objective lens onto a record surface of an optical disc, such as a CD or a DVD, being used. Incidentally, in this specification, the "optical information recording/reproducing devices" include devices for both information reproducing and information recording, devices exclusively for information reproducing, and devices exclusively for information recording. In the following, the term "compatibility" is used to mean that the optical information recording/reproducing device ensures the information reproducing and/or information recording with no need of component replacement even when the optical disc being used is switched.

In most cases, lenses of the above described types provided in optical information recording/reproducing devices are made of resin. Therefore, the refractive index of such a lens varies depending on change in environmental conditions, such as temperature variations. More specifically, the actual refractive index may change from a design refractive index defined when the lens is designed. The change in refractive index of a lens leads to change of a positional relationship between an object point and an image point with respect to the position of the lens.

It is noted that a lens made of resin has a linear expansion coefficient larger than that of a lens made of glass. Such a property of a lens made of resin causes a considerable amount of change of the positional relationship between an object point and an image point with respect to the position of the lens.

Even if change of the positional relationship between an object point and an image point with respect to the position of the objective lens is caused due to change of the refractive index of the objective lens, the optical information recording/reproducing device is able to cancel the effect of the change in refractive index by executing a focusing function which is one of primary functions of the optical information recording/reproducing device.

However, if change in refractive index of the coupling lens which is placed only on an approaching optical path of a light beam proceeding to an optical disc (but is not placed on a returning optical path of the light beam returning from the optical disc) occurs, the following problems occur.

First, the light beam emerging from the coupling lens may have an unintended degree of divergence. If the degree of divergence of the light beam emerging from the coupling lens changes, the spherical aberration is caused. In this case, it becomes difficult to form a suitable beam spot for information recording or information reproducing on a record surface of the optical disc. Second, since typically a photoreceptor for receiving light reflected from the record surface of the optical disc is placed at a position having a conjugate relationship with an image point of the coupling lens, the conjugate relationship is lost if the image point of the coupling lens changes due to change in refractive index or linear expansion and thereby it may become difficult for the photoreceptor to execute an accurate detecting operation.

Examples of configurations for solving the above described problems are discussed in Japanese Patent Provisional Publications Nos. 2001-159731A (hereafter, referred to as JP2001-159731A) and 2003-114382A (hereafter, referred to as JP 2003-114382A).

The coupling lens disclosed in JP2001-159731A is provided with a diffraction structure so that the problem that the degree of divergence of a light beam emerging from a coupling lens changes due to change in refractive index can be solved. The coupling lens disclosed in JP 2003-114382A is also provided with a diffraction structure so that the problem that an image point relative to an object point changes due to change in refractive index can be solved. However, it is noted that the diffraction structure increases the manufacturing difficulty of the coupling lens and thereby increases the manufacturing cost of the coupling lens.

SUMMARY OF THE INVENTION

The present invention is advantageous in that it provides at least one of a coupling lens capable of suppressing change of a relative positional relationship between an object point and an image point due to change in refractive index while achieving a low cost and a simple structure, and an optical information recording/reproducing device in which such a coupling lens is employed.

According to an aspect of the invention, there is provided a coupling lens used in an optical information recording/reproducing device for recording information to and/or reproducing information from an optical disc. The coupling lens includes a first surface and a second surface, wherein the coupling lens is configured to satisfy a following condition (1):

$$-0.80 \leq Z \leq 0.40 \qquad (1),$$

wherein a value Z is obtained from a following equation (E1):

$$Z = \frac{\frac{d}{dn}(L')}{L'} = \frac{(A-B)}{(D-E)} - \frac{(F-G)}{(H-I)} \qquad (E1)$$

where, $$A = \frac{t}{n^2}$$

$$B = \frac{tL}{n^2 r_1}$$

$$D = -\frac{t}{n}$$

$$E = \left(1 - \frac{1}{n}\right)\frac{tL}{r_1} - L$$

$$F = \frac{t}{n^2 r_2}$$

$$G = -\frac{(r_2 - r_1) + \left(1 - \frac{1}{n^2}\right)t}{r_1 r_2}L$$

$$H = 1 - \left(\frac{1}{n} - 1\right)\frac{t}{r_2}$$

$$I = -\frac{(r_2 - r_1)(n-1) + \left(n + \frac{1}{n} - 2\right)t}{r_1 r_2}L$$

r1 denotes a curvature radius of the first surface the coupling lens, r2 denotes a curvature radius of the second surface of the coupling lens, n denotes a design refractive index of the coupling lens, L denotes a working distance defined for an object point, and L' denotes an working distance defined for an image point.

By configuring the coupling lens such that the value Z satisfy the above described condition, it becomes possible to maintain a relative positional relationship between an object point and an image point at a suitable state without using a diffraction structure.

In at least one aspect, the coupling lens may further satisfy a following condition:

$$-0.41 \leq Z \leq 0.23 \quad (2).$$

According to another aspect of the invention, there is provided an optical information recording/reproducing device for recording information to and/or reproducing information from an optical disc, which includes a light source that emits a light beam, the above described coupling lens that changes a degree of divergence of the light beam emitted by the light source, and an objective lens that converges the light beam passed through the coupling lens onto a record surface of the optical disc.

In at least one aspect, the light source may be located at a position corresponding to the object point of the coupling lens.

DETAILED DESCRIPTION OF THE EMBODIMENTS

Hereinafter, an embodiment according to the invention is described with reference to the accompanying drawings.

In the following, an optical information recording/reproducing device 100 (see FIG. 1) according to an embodiment is described. The optical information recording/reproducing device 100 according to the embodiment has the compatibility with three types of optical discs of different standards concerning optical properties, such as protective layer thicknesses and recording densities.

In the following explanation, an optical disc of a type (one of the three types) having the highest recording density (e.g., a new-standard optical disc such as HD DVD or BD) will be referred to as an "optical disc D1", an optical disc of a type having a relatively low recording density compared to the optical disc D1 (DVD, DVD-R, etc.) will be referred to as an "optical disc D2", and an optical disc of a type having the lowest recording density (CD, CD-R, etc.) will be referred to as an "optical disc D3" for convenience of explanation.

If the protective layer thicknesses of the optical discs D1-D3 are defined as t1, t2, t3, respectively, the protective layer thicknesses satisfy a following relationship.

$$t1 \leq t2 < t3$$

In order to carry out the information reproducing/recording on each of the optical discs D1-D3, the NA (Numerical Aperture) required for the information reproducing/recording has to be varied properly so that a beam spot suitable for a particular recording density of each optical disc can be formed. When the optimum design numerical apertures required for the information reproducing/recording on the three types of optical discs D1, D2 and D3 are defined as NA1, NA2 and NA3, respectively, the numerical apertures (NA1, NA2, NA3) satisfy the following relationships:

$$(NA1 > NA3) \text{ and } (NA2 > NA3)$$

Specifically, for the information recording/reproducing on the optical discs D1 and D2 having high recording densities, a relatively large NA is required since a relatively small spot has to be formed. On the other hand, for the information recording/reproducing on the optical disc D3 having the lowest recording density, the required NA is relatively small. Incidentally, each optical disc is set on a turntable (not shown) and rotated at high speed when the information recording/reproducing is carried out.

In cases where three types of optical discs D1-D3 (having different recording densities) are used as above, multiple laser beams having different wavelengths are selectively used by the optical information recording/reproducing device so that a beam spot suitable for each recording density can be formed on the record surface of the optical disc being used.

Specifically, for the information recording/reproducing on the optical disc D1, a "first laser beam" having the shortest wavelength is emitted from a light source so as to form the smallest beam spot on the record surface of the optical disc D1. On the other hand, for the information recording/reproducing on the optical disc D3, a "third laser beam" having the longest wavelength is emitted from a light source so as to form the largest beam spot on the record surface of the optical disc D3. For the information recording/reproducing on the optical disc D2, a "second laser beam" having a wavelength longer than that of the first laser beam and shorter than that of the third laser beam is emitted from a light source so as to form a relatively small beam spot on the record surface of the optical disc D2.

Figure 1:
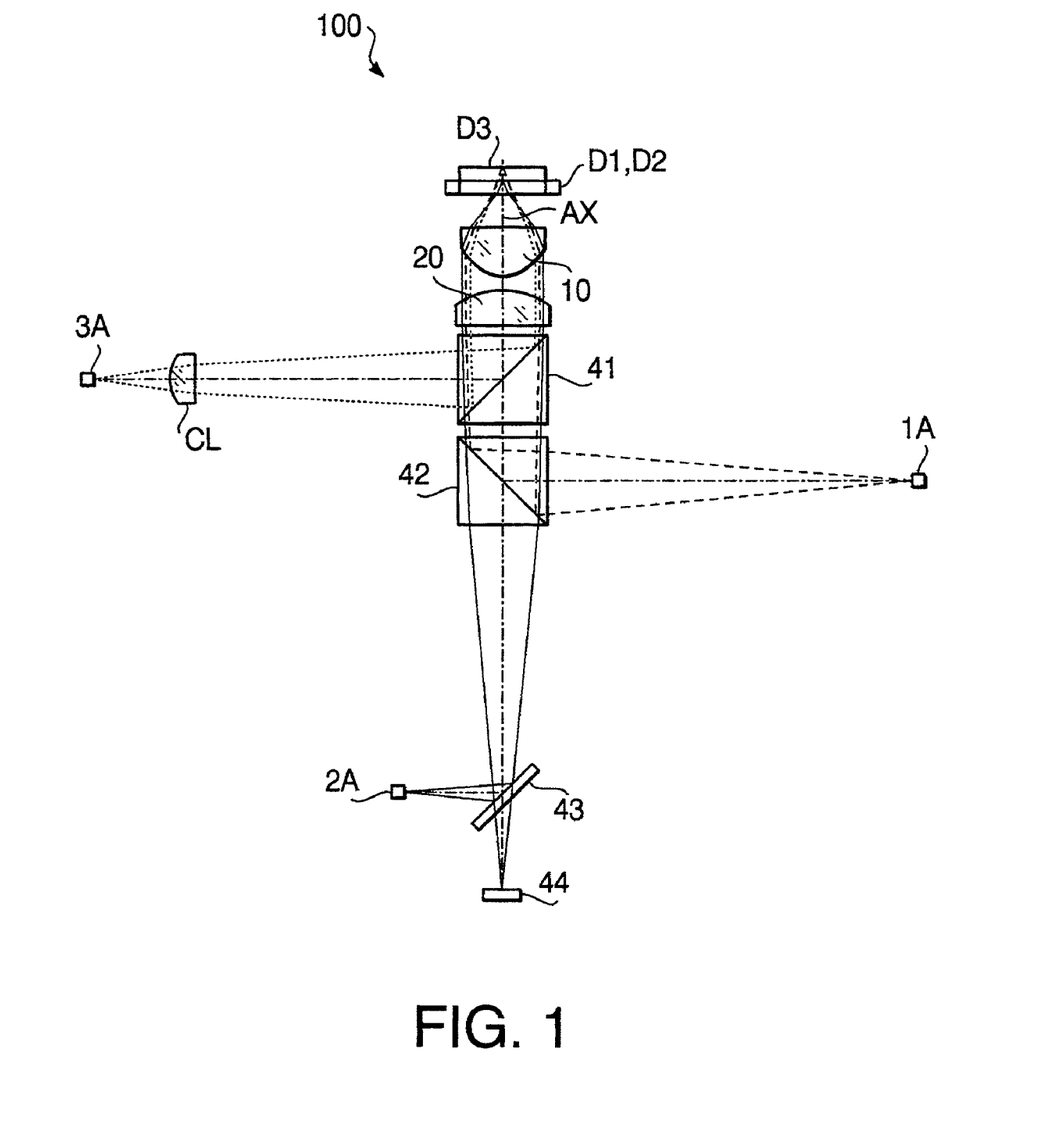
FIG. 1 illustrates a general configuration of an optical information recording/reproducing device according to an embodiment.

FIG. 1 illustrates a general configuration of the optical information recording/reproducing device 100 according to the embodiment. As shown in FIG. 1, the optical information recording/reproducing device 100 includes a light source 1A which emits the first laser beam, a light source 2A which emits the second laser beam, a light source 3A which emits the third laser beam, a coupling lens CL, a collimator lens 20, beam splitters 41 and 42, a half mirror 43, a photoreceptor 44, and an objective lens 10.

Since numerical apertures for the three types of optical discs are different from each other, the optical information recording/reproducing device 100 needs to change the numerical aperture depending on the type of the optical disc being used. Therefore, the optical information recording/reproducing device 100 may be provided with an aperture stop for limiting the beam diameter of the third laser beam on an optical path from the light source 3A to the objective lens 10.

As shown in FIG. 1, for information recording or the information reproducing for each of the optical discs D1 and D2, the laser beam emitted from each of the light sources 1A and 2A is directed to a common path through the beam splitter 42 and the half mirror 43, and is converted into a collimated beam by the collimator lens 20. The laser beam which passed through the collimator lens 20 is then incident on the objective lens 10.

Figure 2:
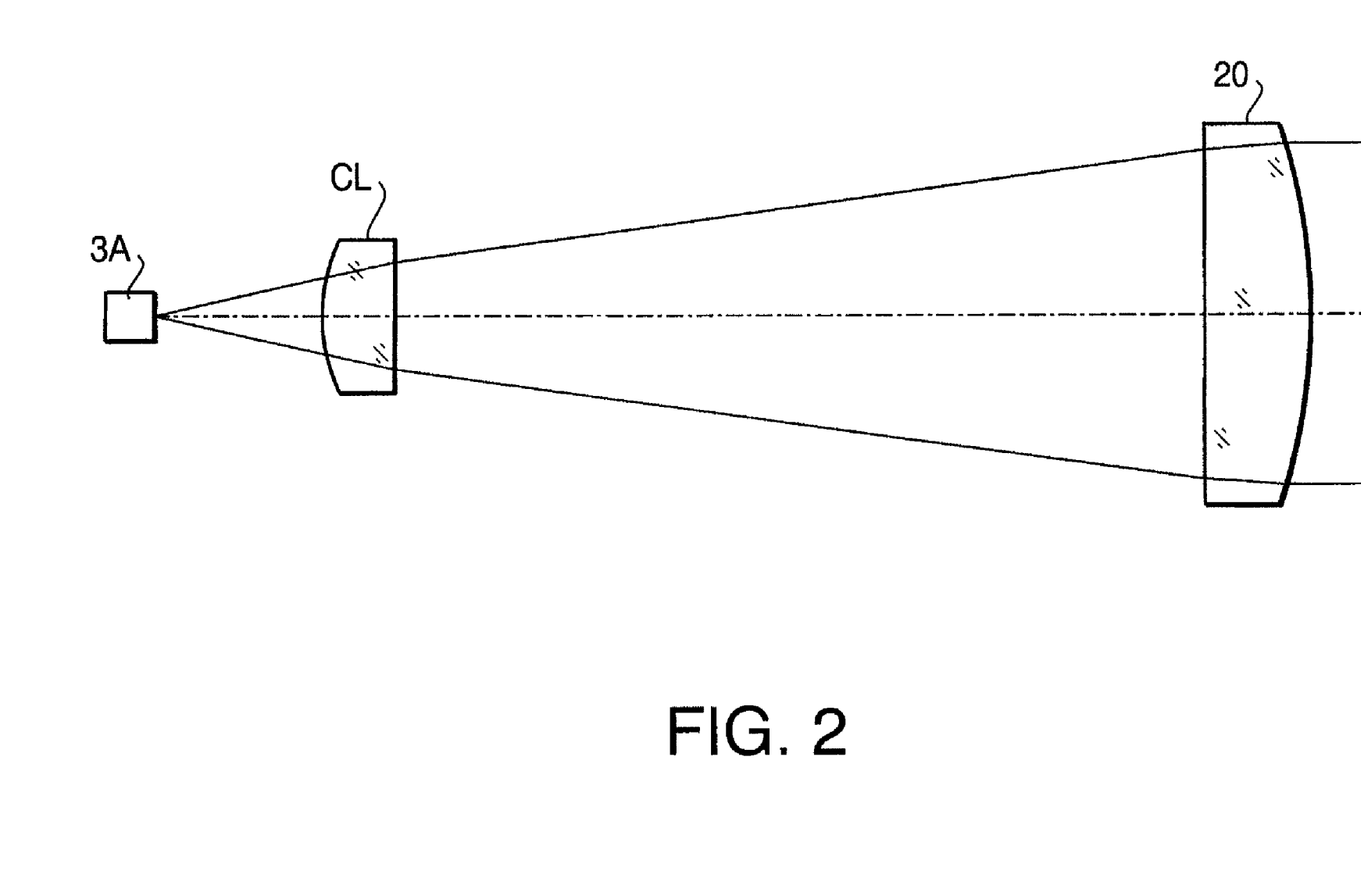
FIG. 2 is an enlarged view illustrating an optical path from a light source to a coupling lens.

When the information recording or the information reproducing for the optical disc D3 is performed, the third laser beam emitted from the light source 3A is incident on the coupling lens CL. FIG. 2 is an enlarged view illustrating an optical path from the light source 3A to the coupling lens CL. In FIG. 2, the beam splitters 41 and 42 are omitted for the sake of simplicity. The coupling lens CL changes the degree of divergence of the third laser beam. The third laser beam which emerged from the coupling lens is deflected by the beam splitter 41, and is then incident on the collimator lens 20. The third laser beam collimated by the collimator lens 29 is then incident on the objective lens 10.

Since the first to third laser beams having different wavelengths are selectively used for the optical discs D1-D3 in the optical information recording/reproducing device 100, the spherical aberration varies depending on change in refractive index of the objective lens 10 and the difference between protective layer thicknesses of the optical discs D1-D3.

The optical information recording/reproducing device 100 is configured to achieve the compatibility with the three types of optical discs D1-D3 by correcting the spherical aberration caused when the optical discs is switched between the three types of optical discs. For example, at least one of surfaces of the objective lens 10 is provided with a diffraction structure having diffraction effects on each of the three types of laser beams. The diffraction structure has a plurality of refractive surface zones (annular zones) concentrically formed about an optical axis AX (see FIG. 1). The plurality of annular zones are divided by minute steps formed between adjacent ones of the plurality of annular zones. Each step is designed to add a predetermined optical path length to the first laser beam.

The laser beam which passed through the objective lens 10 converges onto the optical disc being used. Each laser beam reflecting from the record surface of the optical disc being used passes through the half mirror 43, and is then detected by the photoreceptor 44.

By converting each laser beam to be incident on the objective lens 10 into the collimated beam, it becomes possible to suppress the occurrence of off-axis aberration, such as a coma, due to shifting of the objective lens 10 during a tracking operation.

Figure 3:
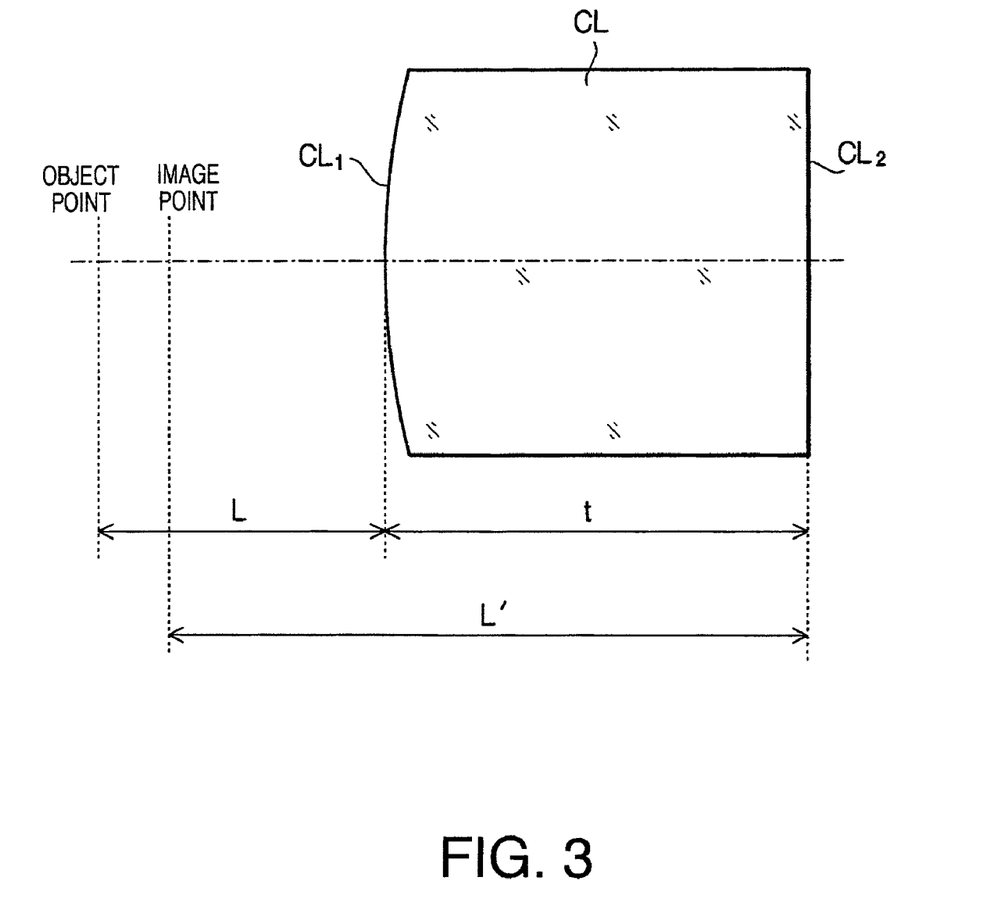
FIG. 3 is an explanatory illustration for explaining a configuration of the coupling lens.

FIG. 3 is an explanatory illustration for explaining a configuration of the coupling lens CL. As shown in FIG. 3, the coupling lens CL has a first surface $CL_1$ and a second surface $CL_2$. In this embodiment, the coupling lens CL is designed such that at least one of the first and second surfaces $CL_1$ and $CL_2$ is an aspherical surface to suitably correct aberrations. It should be understood that both of the first and surfaces $CL_1$ $CL_2$ may be formed to be aspherical surfaces. If one of the first and the second surfaces $CL_1$ and $CL_2$ is formed to be an aspherical surface, one of the spherical aberration and offense against the sine condition can be corrected. If both of the first and second surfaces $CL_1$ and $CL_2$ are formed to be aspherical surfaces, both of the spherical aberration and offense against the sine condition can be properly corrected.

A shape of an aspherical surface is expressed by a following equation:

$$X(h) = \frac{ch^2}{1+\sqrt{1-(1+K)c^2h^2}} + \sum_{i=2} A_{2i}h^{2i}$$

where, X(h) represents a SAG amount which is a distance between a point on the aspherical surface at a height of h from the optical axis and a plane tangential to the aspherical surface at the optical axis, symbol c represents curvature (1/r) on the optical axis, K is a conical coefficient, and $A_{2i}$ represents an aspherical coefficient of an even order larger than or equal to the fourth order.

Hereafter, "r1" denotes a curvature radius of the first surface $CL_1$ of the coupling lens CL, "r2" denotes a curvature radius of the second surface $CL_2$ of the coupling lens CL, "n" represents a design refractive index of the coupling lens CL, and "L" denotes a working distance defined for an object point (hereafter, frequently referred to as an object working distance). Actually, in the optical information recording/reproducing device 100, a light source is located and fixed at the object point of the first surface $CL_1$. Therefore, in the following, a distance between the object point and a lens surface (i.e., an incident side surface $CL_1$) facing the object point is regarded as a constant value. That is, change of a relative positional relationship between the object point and the image point is regarded as change of a distance L' (a working distance defined for an image point) between the image point and the exit side surface $CL_2$ of the coupling lens CL. Hereafter, the distance L' is frequently referred to as an image working distance. Further, "t" denotes a center thickness of the coupling lens at a central axis of the coupling lens.

The coupling lens CL is arranged in the optical information recording/reproducing device 100 such that a value Z obtained from the following equation (E1) satisfies a predetermined condition.

$$Z = \frac{\frac{d}{dn}(L')}{L'} = \frac{(A-B)}{(D-E)} - \frac{(F-G)}{(H-I)} \tag{E1}$$

where, $$A = \frac{t}{n^2}$$

$$B = \frac{tL}{n^2 r_1}$$

$$D = -\frac{t}{n}$$

$$E = \left(1 - \frac{1}{n}\right)\frac{tL}{r_1} - L$$

$$F = \frac{t}{n^2 r_2}$$

$$G = -\frac{(r_2 - r_1) + \left(1 - \frac{1}{n^2}\right)t}{r_1 r_2}L$$

$$H = 1 - \left(\frac{1}{n} - 1\right)\frac{t}{r_2}$$

$$I = -\frac{(r_2 - r_1)(n-1) + \left(n + \frac{1}{n} - 2\right)t}{r_1 r_2}L$$

The value Z obtained from the above described equation corresponds to a value obtained by formulating the image working distance L' with the above described parameters r1, r2, t, n and L, differentiating the formulated value with the design refractive index n, and then normalizing the differentiated value by dividing the differentiated value with the image working distance L'.

In this embodiment, the value Z satisfies the following condition (1). The following condition (2) may be satisfied.

$$-0.80 \leq Z \leq 0.40 \tag{1}$$

$$-0.41 \leq Z \leq 0.23 \tag{2}$$

By designing the coupling lens CL to satisfy the condition (1), it is possible to maintain the suitable positional relationship between the object point and the image point even when change in refractive index occurs, without arranging a diffraction structure on the coupling lens. By appropriately controlling the value of each parameter, it is possible to satisfy required specifications including a focal length and magnification. Such advantages become more noticeable when the condition (2) is satisfied.

If a coupling lens having the value Z outside the range defined in the condition (1) is employed in the optical information recording/reproducing device 100, the image working distance largely changes to the extent that the accurate information recording/reproducing is badly affected.

Hereafter, two concrete examples of the coupling lens CL according to the embodiment are described.

First Example

Table 1 shows a concrete numerical configuration of the coupling lens CL according to a first example. Table 2 shows values of Z and the parameters concerning the above described equation (E1) of the coupling lens shown in Table 1.

TABLE 1

| | |
|---|---|
| focal length | 5.761 |
| magnification | 1.262 |
| r1 | 3.240 |
| r2 | −116.800 |
| t | 1.700 |
| L | −1.166 |
| L' | −2.581 |
| n | 1.550 |

TABLE 2

| | |
|---|---|
| A | 0.708 |
| B | −0.255 |
| C | −1.097 |
| D | 0.949 |
| E | −0.006 |
| F | 0.367 |
| G | 0.995 |
| H | 0.202 |
| Z | 0.000 |

The image working distance L' shown in Table 1 is a design value. As shown in Table 2, the coupling lens CL according to the first example satisfies the conditions (1) and (2).

Second Example

The coupling lens CL according to a second example is designed such that both of the first and second surfaces $CL_1$ and $CL_2$ are aspherical surfaces. Table 3 shows a concrete numerical configuration of the coupling lens CL according to the second example. Table 4 shows the conical coefficient and aspherical coefficients defining the first surface $CL_1$ of the coupling lens CL. Table 5 shows the conical coefficient and aspherical coefficients defining the second surface $CL_2$ of the coupling lens CL.

TABLE 3

| | |
|---|---|
| focal length | 189.049 |
| magnification | 1.125 |
| effective diameter (h) of $CL_1$ | 3.000 |
| r1 | −11.500 |

TABLE 3-continued

| | |
|---|---|
| r2 | −10.834 |
| t | 1.500 |
| L | −11.779 |
| L' | −14.959 |
| n | 1.550 |

TABLE 4

| | |
|---|---|
| K | 0.00000 |
| A4 | 1.3780E−04 |
| A6 | 2.4020E−06 |

TABLE 5

| | |
|---|---|
| K | 0.00000 |
| A4 | 8.2210E−05 |
| A6 | 1.5340E−06 |

Table 6 shows values of Z and the parameters concerning the above described equation (E1) of the coupling lens CL shown in Table 3.

TABLE 6

| | |
|---|---|
| A | 0.624 |
| B | 0.639 |
| C | −0.968 |
| D | 12.324 |
| E | −0.058 |
| F | 0.146 |
| G | 0.951 |
| H | 0.062 |
| Z | 0.230 |

As shown in Table 6, the coupling lens CL according to the second example satisfies the conditions (1) and (2).

Comparative Example

Hereafter, a coupling lens according to a comparative example is described. The coupling lens according to the comparative example is configured to suppress the spherical aberration and offense against the sine condition as low as possible without using an aspherical surface. That is, the design of the comparative example is based on a conventional technique.

Table 7 shows a concrete numerical configuration of the coupling lens CL according to the comparative example. Table 8 shows values of Z and the parameters concerning the above described equation (E1) of the coupling lens shown in Table 7.

TABLE 7

| | |
|---|---|
| focal length | 17.995 |
| magnification | 2.000 |
| r1 | −6.743 |
| r2 | −3.579 |
| t | 1.000 |
| L | −5.000 |
| L' | −11.817 |
| n | 1.550 |

TABLE 8

| | |
|---|---|
| A | 0.416 |
| B | 0.309 |
| C | −0.645 |
| D | 5.263 |
| E | −0.116 |
| F | 0.776 |
| G | 0.901 |
| H | 0.401 |
| Z | 1.768 |

Figure 4:
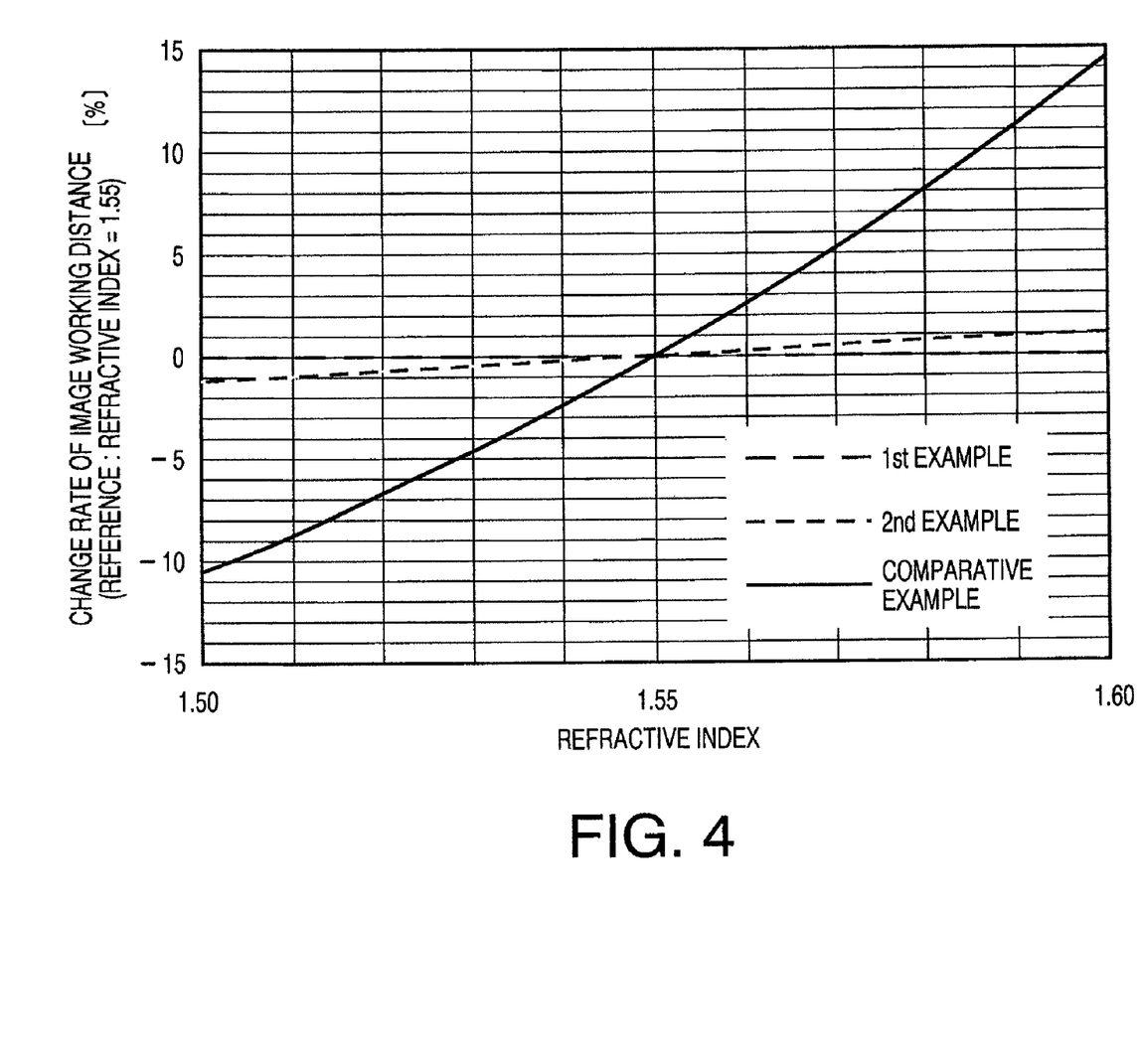
FIG. 4 is a graph illustrating the relationship between change in refractive index and the image working distance for each of first and second examples and a comparative example.

FIG. 4 is a graph illustrating the relationship between change in refractive index and the image working distance L' for each of the first and second examples and the comparative example. As shown in FIG. 4, the coupling lens CL according to each of the first and second examples satisfying the conditions (1) and (2) has the change rate of the image working distance with respect to the change in refractive index being approximately equal to zero. That is, by employing the coupling lens CL according to each of the first and second examples in the optical information recording/reproducing device 100, even if the refractive index of the coupling lens CL changes due to, for example, temperature variations during use of the optical disc D3, the photoreceptor 44 is able to constantly execute a suitable detection operation without being affected by the change in refractive index.

By contrast, the image working distance L' of the coupling lens according to the comparative examples changes largely with the change in refractive index. That is, the coupling lens according to the comparative example shows the large change rate of the image working distance L'.

As described above, one of factors causing change in refractive index is temperature variation. If temperature changes, the linear expansion may occur in the coupling lens CL. In this regard, the coupling lens according to the embodiment is able to maintain the relative positional relationship between the object point and the image point even if such an undesirable phenomenon occurs.

Although the present invention has been described in considerable detail with reference to certain preferred embodiments thereof, other embodiments are possible.

In the above described embodiment, the coupling lens is formed to be a biconvex lens. However, the coupling lens according to the embodiment may have various types of shapes while satisfying the above described conditions (1) and (2). For example, the coupling lens may have a meniscus shape depending on magnification, the lens thickness or a temperature change property of the object image distance.

This application claims priority of Japanese Patent Application No. P2007-276441, filed on Oct. 24, 2007. The entire subject matter of the applications is incorporated herein by reference.

What is claimed is:

1. A coupling lens used in an optical information recording/reproducing device for recording information to and/or reproducing information from an optical disc, the coupling lens comprising a first surface and a second surface, wherein the coupling lens is configured to have a value Z which satisfies a following condition (1):

$$-0.80 \leq Z \leq 0.40 \tag{1},$$

wherein the value Z in the condition (1) is obtained from a following equation (E1):

$$Z = \frac{\frac{d}{dn}(L')}{L'} = \frac{(A-B)}{(D-E)} - \frac{(F-G)}{(H-I)} \tag{E1}$$

where, $$A = \frac{t}{n^2}$$

$$B = \frac{tL}{n^2 r_1}$$

$$D = -\frac{t}{n}$$

$$E = \left(1 - \frac{1}{n}\right)\frac{tL}{r_1} - L$$

$$F = \frac{t}{n^2 r_2}$$

$$G = -\frac{(r_2 - r_1) + \left(1 - \frac{1}{n^2}\right)t}{r_1 r_2}L$$

$$H = 1 - \left(\frac{1}{n} - 1\right)\frac{t}{r_2}$$

$$I = -\frac{(r_2 - r_1)(n-1) + \left(n + \frac{1}{n} - 2\right)t}{r_1 r_2}L$$

r1 denotes a curvature radius of the first surface the coupling lens, r2 denotes a curvature radius of the second surface of the coupling lens, n denotes a design refractive index of the coupling lens, L denotes a working distance defined for an object point, L' denotes an working distance defined for an image point, and t denotes a center thickness of the coupling lens at a central axis of the coupling lens.

2. The coupling lens according to claim 1, wherein the value Z further satisfies a following condition:

$$-0.41 \leq Z \leq 0.23 \tag{2}.$$

3. An optical information recording/reproducing device for recording information to and/or reproducing information from an optical disc, comprising:
a light source that emits a light beam;
a coupling lens that changes a degree of divergence of the light beam emitted by the light source; and
an objective lens that converges the light beam passed through the coupling lens onto a record surface of the optical disc,
wherein the coupling lens comprising a first surface and a second surface, wherein the coupling lens is configured to have a value Z which satisfies a following condition (1):

$$-0.80 \leq Z \leq 0.40 \tag{1},$$

wherein the value Z is obtained from a following equation (E1):

$$Z = \frac{\frac{d}{dn}(L')}{L'} = \frac{(A-B)}{(D-E)} - \frac{(F-G)}{(H-I)} \tag{E1}$$

where, $$A = \frac{t}{n^2}$$

$$B = \frac{tL}{n^2 r_1}$$

-continued $$D = -\frac{t}{n}$$

$$E = \left(1 - \frac{1}{n}\right)\frac{tL}{r_1} - L$$

$$F = \frac{t}{n^2 r_2}$$

$$G = -\frac{(r_2 - r_1) + \left(1 - \frac{1}{n^2}\right)t}{r_1 r_2} L$$

$$H = 1 - \left(\frac{1}{n} - 1\right)\frac{t}{r_2}$$

$$I = -\frac{(r_2 - r_1)(n-1) + \left(n + \frac{1}{n} - 2\right)t}{r_1 r_2} L$$

r1 denotes a curvature radius of the first surface the coupling lens, r2 denotes a curvature radius of the second surface of the coupling lens, n denotes a design refractive index of the coupling lens, L denotes a working distance defined for an object point, L' denotes an working distance defined for an image point, and t denotes a center thickness of the coupling lens at a central axis of the coupling lens.

4. The optical information recording/reproducing device according to claim 3, wherein the value Z further satisfies a following condition:

$$-0.41 \leq Z \leq 0.23 \tag{2}$$

5. The optical information recording/reproducing device according to claim 3, wherein the light source is located at a position corresponding to the object point of the coupling lens.

* * * * *